US010332389B2

(12) United States Patent
Ivanov et al.

(10) Patent No.: US 10,332,389 B2
(45) Date of Patent: Jun. 25, 2019

(54) EXTRAPOLATING SPEED LIMITS WITHIN ROAD GRAPHS

(71) Applicant: HARMAN BECKER AUTOMOTIVE SYSTEMS GMBH, Karlsbad-Ittersbach (DE)

(72) Inventors: Volodymyr Ivanov, Odelzhausen (DE); Alexey Pryakhin, Munich (DE); Ievgenii Borshch, Munich (DE)

(73) Assignee: HARMAN BECKER AUTOMOTIVE SYSTEMS GmbH, Karlsbad-Ittersbach (DE)

( * ) Notice: Subject to any disclaimer, the term of this patent is extended or adjusted under 35 U.S.C. 154(b) by 1 day.

(21) Appl. No.: 15/653,314

(22) Filed: Jul. 18, 2017

(65) Prior Publication Data

US 2018/0023973 A1     Jan. 25, 2018

Related U.S. Application Data

(60) Provisional application No. 62/364,805, filed on Jul. 20, 2016.

(51) Int. Cl.
*G06F 8/65*     (2018.01)
*G06T 7/12*     (2017.01)
(Continued)

(52) U.S. Cl.
CPC ......... *G08G 1/0104* (2013.01); *G01C 15/002* (2013.01); *G01C 21/26* (2013.01); *G01C 21/28* (2013.01); *G01C 21/30* (2013.01); *G01C 21/32* (2013.01); *G01C 21/3415* (2013.01); *G01C 21/36* (2013.01); *G01C 21/3697* (2013.01);
(Continued)

(58) Field of Classification Search
CPC ...... G08G 1/0104; G08G 1/052; G08G 1/093; G08G 1/20; G08G 1/0967; G08G 1/096716; G01C 21/32; G01C 21/3697; G01C 21/3415; G01C 21/36; G01C 21/30; G01C 15/002; G01C 21/26; G01C 21/28; G01S 19/51; G01S 19/53; G06F 17/30241; G06F 17/30595; G06F 17/10; G06F 9/44526; G06F 8/65; G06T 17/05; G06T 7/12

See application file for complete search history.

(56) References Cited

U.S. PATENT DOCUMENTS

| 2008/0004789 | A1* | 1/2008 | Horvitz | G01C 21/3492 |
| | | | | 701/117 |
| 2012/0197839 | A1* | 8/2012 | Vervaet | G01C 21/32 |
| | | | | 707/609 |
| 2012/0271864 | A1* | 10/2012 | Morlock | G08G 1/09623 |
| | | | | 707/803 |

* cited by examiner

*Primary Examiner* — Russell Frejd
(74) *Attorney, Agent, or Firm* — Artegis Law Group, LLP

(57) ABSTRACT

In one embodiment, a speed limit application associates speed limits with road segments based on a road graph. In operation, the speed limit application selects a source road segment that meets a target road segment at an intersection based on the road graph. The source road segment is associated with a speed limit. Subsequently, the speed limit application determines a confidence value associated with extrapolating the first speed limit to the target road segment based on the first road graph. The speed limit application then determines that the confidence value indicates that a confidence in the extrapolation satisfies a minimum confidence requirement. Consequently, the speed limit application generates an attribute that associates the first speed limit with the target road segment. Finally, the speed limit application causes a navigation-related operation to be performed based on the attribute.

20 Claims, 4 Drawing Sheets

(51) Int. Cl.
*G08G 1/00* (2006.01)
*G08G 1/01* (2006.01)
*G08G 1/09* (2006.01)
*G01C 15/00* (2006.01)
*G01C 21/26* (2006.01)
*G01C 21/28* (2006.01)
*G01C 21/30* (2006.01)
*G01C 21/32* (2006.01)
*G01C 21/34* (2006.01)
*G01C 21/36* (2006.01)
*G01S 19/51* (2010.01)
*G01S 19/53* (2010.01)
*G06F 16/28* (2019.01)
*G06F 16/29* (2019.01)
*G06F 17/10* (2006.01)
*G06F 9/445* (2018.01)
*G06T 17/05* (2011.01)
*G08G 1/052* (2006.01)
*G08G 1/0967* (2006.01)

(52) U.S. Cl.
CPC ............. *G01S 19/51* (2013.01); *G01S 19/53* (2013.01); *G06F 8/65* (2013.01); *G06F 9/44526* (2013.01); *G06F 16/284* (2019.01); *G06F 16/29* (2019.01); *G06F 17/10* (2013.01); *G06T 7/12* (2017.01); *G06T 17/05* (2013.01); *G08G 1/052* (2013.01); *G08G 1/093* (2013.01); *G08G 1/0967* (2013.01); *G08G 1/096716* (2013.01); *G08G 1/20* (2013.01)

EXTRAPOLATING SPEED LIMITS WITHIN ROAD GRAPHS

CROSS-REFERENCE TO RELATED APPLICATIONS

This application claims benefit of the U.S. Provisional Patent Application having Ser. No. 62/364,805 and filed on Jul. 20, 2016. The subject matter of this related application is hereby incorporated herein by reference.

BACKGROUND

Field of the Various Embodiments

The various embodiments relate generally to navigation subsystems and, more specifically, to extrapolating speed limits within road graphs.

Description of the Related Art

Many vehicles include navigation applications that perform navigation-related activities based on satellite navigation devices (e.g., global positioning system devices) and road graphs that specify underlying, physical road networks. A road graph typically represents each road segment (i.e., a portion of a road) as an edge that extends between two nodes, where each node represents an intersection. To enable a wide range of navigation-related activities, road network graphs are typically configured to associate data with edges and nodes via attributes. For instance, a speed limit attribute associates a speed limit applicable to vehicles traveling along a road segment with an edge representing the road segment. Speed limit attributes enable navigation applications to estimate travel times, generate warnings when a speed limit is exceeded, and so forth.

In one approach to generating speed limit attributes, road graph providers rely on observations of speed limit signs by vehicles traveling along road segments. For each speed limit sign, a data collection application identifies an edge of the road network graph as a matching edge based, at least in part, on a distance between an observed position of the speed limit sign and the edge. The attribute application then generates a speed limit attribute that associates the speed limit specified by the speed limit sign with the road segment associated with the matching edge.

One limitation of the attribute application is that the attribute application associates a speed limit specified via a speed limit sign with only one road segment. By contrast, a speed limit sign often specifies a speed limit that is applicable to multiple road segments, as dictated by local traffic laws. Consequently, a navigation application that relies on the road graph may not be able to reliably perform certain navigation-related activities.

For example, suppose that a speed limit sign specifying 35 MPH lies along a road segment A, and the speed limit sign is applicable to both the road segment A and a subsequent road segment B. The speed limit application would generate a speed limit attribute that associates a 35 MPH speed limit with the road segment A. If the speed of a vehicle traveling along the road segment A exceeds the actual speed limit of 35 MPH, then a navigation application would determine that the speed of the vehicle exceeds the speed limit based on the speed limit attribute. As a result, the navigation application would display a warning to the driver. By contrast, if the speed of the vehicle while traveling along the road segment B exceeds the actual speed limit of 35 MPH, then the navigation application would not be able to identify the speed limit and would not display a warning to the driver.

As the foregoing illustrates, more effective techniques for associating speed limits with road segments would be useful.

SUMMARY

One embodiment sets forth a method for associating speed limits with road segments. The method includes identifying a first road segment included in a first road graph as a source of a second road segment, where the first road segment is associated with a first speed limit and meets the second road segment at a first intersection; extrapolating the first speed limit to the second road segment based on the first road graph; generating a first attribute that associates the first speed limit with the second road segment; and causing a first navigation-related operation to be performed based on the first attribute.

Further embodiments provide, among other things, a system and a computer-readable medium configured to implement the method set forth above.

At least one advantage of the disclosed techniques is that, by extrapolating speed limits, the disclosed techniques are able to more comprehensively associate speed limits with road segments. In particular, the disclosed techniques selectively extrapolate an observation of a road sign specifying a speed limit to generate multiple attributes, where each attribute associates the speed limit with a different road segment for which the road sign is applicable. Consequently, navigation applications may accurately perform navigation operations for the different road segments based on the attributes.

BRIEF DESCRIPTION OF THE DRAWINGS

So that the manner in which the above recited features can be understood in detail, a more particular description of the various embodiments, briefly summarized above, may be had by reference to certain embodiments, some of which are illustrated in the appended drawings. It is to be noted, however, that the appended drawings illustrate only typical embodiments and are therefore not to be considered limiting of scope, for the contemplated embodiments may admit to other equally effective embodiments.

DETAILED DESCRIPTION

In the following description, numerous specific details are set forth to provide a more thorough understanding of the various embodiments. However, it will be apparent to one of skill in the art that various embodiments may be practiced without one or more of these specific details.

Road Graph System

Figure 1:
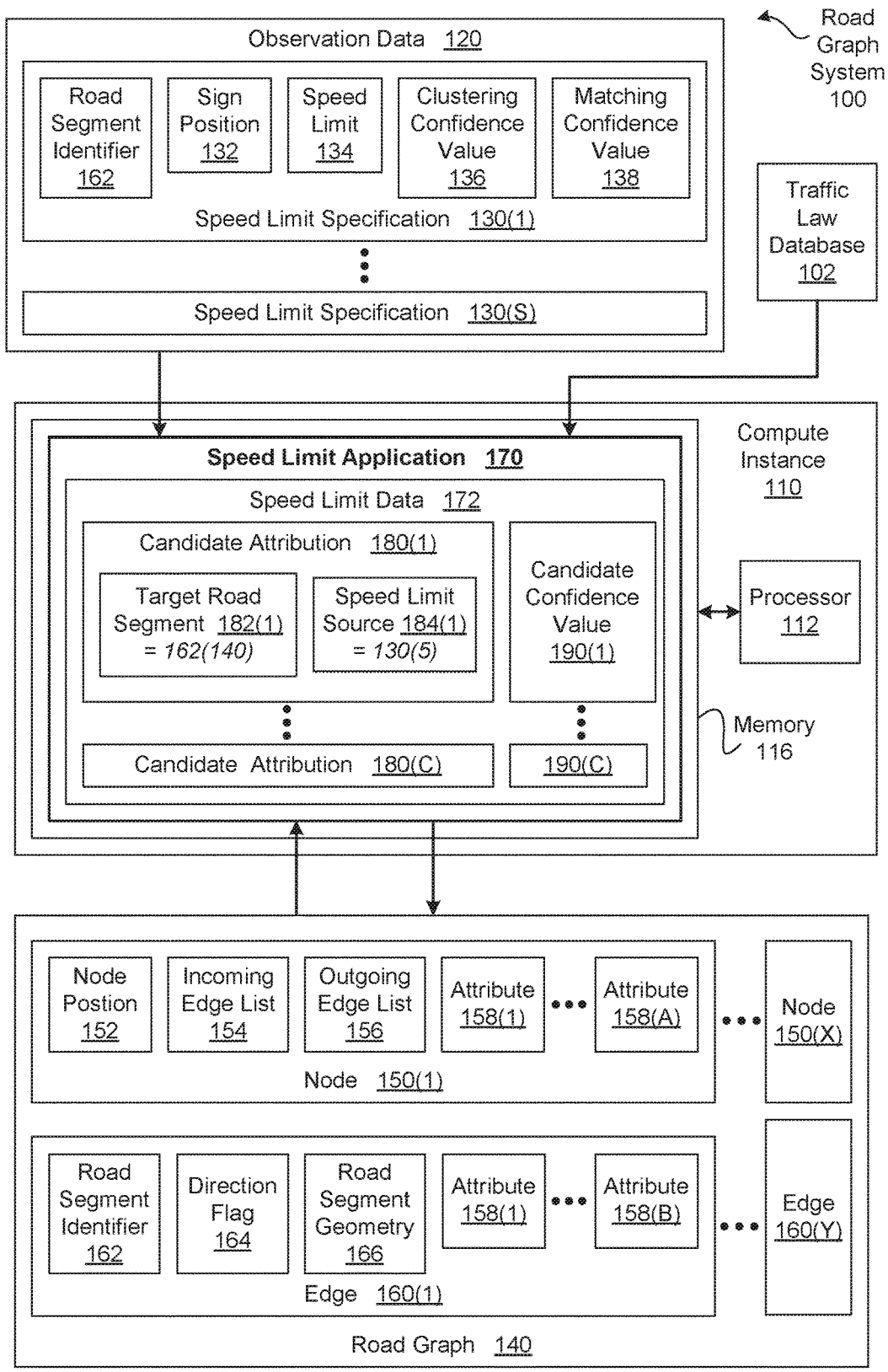
FIG. 1 illustrates a road graph system configured to implement one or more aspects of the various embodiments.

FIG. 1 illustrates a road graph system 100 configured to implement one or more aspects of the various embodiments. As shown, the road graph system 100 includes, without limitation, a road graph 140, observation data 120, a compute instance 110, and a traffic law database 102. In alternate embodiments, the road graph system 100 may include any number (including zero) of road graphs 140, observation data 120, compute instances 110, and traffic law databases 102. For explanatory purposes, multiple instances of like objects are denoted with reference numbers identifying the object and parenthetical numbers identifying the instance, where needed.

The road graph 140 represents at least a portion of an underlying road network as a directed graph. As shown, the road graph 140 includes, without limitation, any number of nodes 150 and any number of edges 160. Each of the nodes 150 represents a discrete point within the underlying road network. Each of the edges 160 represents a road segment and is associated with a traveling direction along the road segment. As referred to herein, a road segment is a portion of a road that lies between two discrete points that are represented by two of the nodes 150. For example, a road segment could be a portion of a one-lane road that lies between two intersections or the east-west lanes of a portion of a freeway that lies between two exits. In alternate embodiments, one or more of the edges 160 may be associated with two traveling directions.

As shown, each of the nodes 150 includes, without limitation, a node position 152, an incoming edges list 154, an outgoing edges list 156, and any number (including zero) of attributes 158. The node position 152 specifies the location of the node 150 within the underlying road network. The incoming edges list 154 specifies any number (including zero) of edges 160 that end at the node position 152. The outgoing edges list 156 specifies any number (including zero) of edges 160 that start at the node position 152.

As referred to herein, an "intersection" is any node 150 that includes more than one edge 160 in the incoming edges list 154 and/or more than one edge 160 in the outgoing edges list 154. Examples of intersections include, without limitation, physical intersections between roads, exit ramps, and entrance ramps, to name a few. To enable a wide range of activities, the road graph 140 is configured to associate content with intersections via the attributes 158 that are included in the associated nodes 150. More precisely, each of the attributes 158 included in the node 150 representing a given intersection is associated with the intersection and specifies road data that is related to the intersection or navigation of the intersection. For instance, the attribute 158(1) included in the node 150(1) could specify maneuver restrictions associated with the intersection represented by the node 150(1).

For explanatory purposes, references to an intersection may also be specified in the context of the node 150 representing the intersection and references to the node 150 representing an intersection may also be specified in the context of the intersection. For example, suppose that the node 150(1) represents the intersection "A." The "attributes 158 associated with the intersection A" may also be referred to herein as the attributes 158 associated with the node 150(1) or the attributes 158 included in the node 150(1). Similarly, the "attributes 158 associated with the node 150(1)" or the "attributes 158 included in the node 150(1)" may also be referred to herein as the attributes 158 associated with the intersection A.

Each of the edges 160 includes, without limitation, a road segment identifier 162, a direction flag 164, a road segment geometry 166, and any number (including zero) of attributes 158. The road segment identifier 162 uniquely specifies the road segment within the road database 140 that is associated with the edge 160. The direction flag 164 specifies the traveling direction along the associated road segment. The road segment geometry 166 specifies a shape of the associated road segment. In some embodiments, the road segment geometry 166 comprises a point list. The point list includes a start node 150, any number (including zero) of intermediate points, and an end node 150. For example, to represent a linear road segment, the point list could specify the start node 150(1) and the end node 150(2). In another example, to represent a non-linear road segment, the point list could specify the start node 150(2), six intermediate points, and the end node 150(3).

The road graph 140 is configured to associate content with road segments via the attributes 158 that are included in the associated edges 160. More precisely, each of the attributes 158 included in the edge 160 representing a given road segment is associated with the road segment and specifies road data that is related to the road segment or navigation of the road segment. For instance, the "speed limit" attribute 158(1) included in the edge 160(1) could specify a speed limit that is applicable to the road segment specified via the road segment identifier 162(1).

In some embodiments, the road graph system 100 may include any number of vehicles (not shown in FIG. 1). Each vehicle may include a navigation application that enables a user to perform navigation-related operations based on the road graph 140 and, optionally, sensor data. For example, speed limit attributes 158 included in the road graph 140 enable navigation applications to estimate travel times, generate warnings when a speed limit is exceeded, and so forth. The navigation applications may be associated with the road graph 140 in any technically feasible fashion. For example, a navigation application could access the road graph 140 via the Internet and/or store the road graph 140 in a memory associated with the vehicle.

In one approach to providing road data, a road graph provider generates the attributes 158 based on observations received from numerous vehicles traveling along roads. Typically, each observation specifies data collected by various sensors, such as an estimated position of the vehicle at the time of the observation, an estimated speed of the vehicle at the time of the observation, and an estimated type of the observed object, to name a few. For each observed object, a data collection application generates an object specification based on any number of the observations, includes the object specification in the observation data 120, and transmits the observation data 120 to a conventional attribute application.

In general, the vehicles may be any type of vehicles and may communicate observations to any number of devices and any number of applications in any technically feasible fashion. For example, a particular vehicle could be an autonomous vehicle that transmits/receives observations to/from other vehicles, transmits observations to a server associated with the road graph provider, and/or receives the road graph 140 from another server associated with the road graph provider.

As shown, the observation data 120 includes, without limitation, any number of speed limit specifications 130. Each speed limit specification is an object specification for an observed speed limit sign. As shown, each of the speed limit specifications 130 includes, without limitation, the road segment identifier 162, a sign position 164, a speed limit 166, a clustering confidence value 136, and a matching confidence value 138. The road segment identifier 162 specifies the road segment along which the speed limit sign was observed. The sign position 142 is an estimated position of the speed limit sign. The speed limit 166 is the value specified on the speed limit sign, such as 50 miles per hour (MPH). The cluster confidence value 136 indicates a likelihood that the sign position 132 and the speed limit 134 accurately represent the actual speed limit sign. The matching confidence value 138 indicates a likelihood that the observed speed limit sign lies along the road segment specified by the road segment identifier 162.

In various embodiments, the speed limit specification 130 may specify any amount and type of additional information and/or omit any number of the road segment identifier 162, the sign position 164, the speed limit 166, the clustering confidence value 136, and the matching confidence value 138. For instance, in some embodiments, the speed limit specification 130 may include any number of confidence values (including zero) in any technically feasible fashion, where each confidence value may represent a reliability associated with the speed limit specification 130. In the same or other embodiments, the speed limit specification 130 may include a side of the road segment along which the speed limit sign was observed.

Upon receiving the observation data 120, for each speed limit specification 130, a conventional attribute application generates the speed limit attribute 158 that associates the speed limit 166 with the road segment specified via the road segment identifier 162. One limitation of the conventional attribute application is that the conventional attribute application associates the speed limit 166 with only one road segment. By contrast, oftentimes a speed limit sign specifies the speed limit 166 that is applicable to multiple road segments as dictated by local traffic laws. Consequently, a navigation application that relies on the road graph 140 may not be able to reliably perform certain navigation-related activities.

For example, suppose that a speed limit sign specifying a speed limit of 35 MPH lies along a road segment A, and the speed limit sign is applicable to both the road segment A and a subsequent road segment B as dictated by local traffic laws. A conventional speed limit application would generate the speed limit attribute 158(x) that associates the speed limit 134 "35 MPH" with the road segment A. If the speed of a vehicle traveling along the road segment A exceeds the actual speed limit of 35 MPH, then a navigation application would determine that the speed of the vehicle exceeds the speed limit 134 "35 MPH" based on the speed limit attribute 158(x). As a result, the navigation application would display a warning to the driver. By contrast, if the speed of the vehicle while traveling along the road segment B exceeds the actual speed limit of 35 MPH, then the navigation application would not be able to identify the speed limit and would not display a warning to the driver.

Associating Speed Limits with Road Segments

To more comprehensively associate the speed limits 134 specified by speed limit signs with the proper road segment(s), the road graph system 100 includes a speed limit application 170. In general, the speed limit application 170 generates speed limit attributes 158 based on, without limitation, the observation data 120, the road graph 140, and a traffic law database 102. The traffic law database 102 may include any number of traffic laws applicable to any number of geographical or political regions in any technically feasible fashion. Advantageously, the speed limit application 170 can propagate each speed limit specification 130 to multiple road segments for which the associated speed limit sign is in force and then add the corresponding attributes 158 to the road graph 140.

As shown, the speed limit application 170 includes, without limitation, speed limit data 172. The speed limit data 172 includes, without limitation, any number of candidate attributions 180 and, for each of the candidate attributions 180, a candidate confidence 190. Accordingly, the total number of candidate confidences 190 equals the total number of candidate attributions 180. Each of the candidate attributions 180(x) represents a potential speed limit attribute 158 and includes, without limitation, a target road segment 182 and a speed limit source 184. The target road segment 182 specifies the road segment identifier 162 of a road segment for which the speed limit specification 130 specified by the speed limit source 184 may be applicable. The road segment specified by the road segment identifier 162 may or may not be the road segment along which the speed limit sign represented by the speed limit specification 130 specified by the speed limit source 184 was observed.

For example, as shown, the candidate attribution 180(1) includes, without limitation, the target road segment 182(1) that specifies the road segment identifier 162(140) and the speed limit source 184(1) that specifies the speed limit specification 130(5). Accordingly, the candidate attribute 180(1) potentially associates the speed limit 134 included in the speed limit specification 130(5) with the road segment specified by the road segment identifier 162(140). The road segment specified by the road segment identifier 162(140) may or may not be the road segment along which the speed limit sign represented by the speed limit specification 130(5) was observed.

For explanatory purposes, because the target road segment 182(x) specifies a particular road segment via the road segment identifier 162(i), the target road segment 182(x) may also be referred to as the road segment 130(i) that is associated with the road segment identifier 162(i). Similarly, because the speed limit source 184(x) specifies a particular speed limit specification 130(j), the speed limit source 184(x) may also be referred to herein as the speed limit specification 130(j).

Each of the candidate confidences 190(x) specifies an estimated likelihood that the associated candidate attribution 180(x) accurately associates the speed limit source 184 with the target road segment 182. In some embodiments, the candidate confidences 180 may range from 0 to 100, where 0 indicates that the candidate attribution 180(x) is inaccurate and 100 indicates that the candidate attribution 180 is accurate. For example, suppose that a traffic law indicates that a particular speed limit specification 130 "xyz" is in force for only the road segment xyz along which the associated speed limit sign xyz lies. In such a scenario, the candidate attribution 180(x) that specifies the speed limit source 184 as the specification 130 xyz and the target road segment 182 as the road segment xyz is associated with the candidate confidence 190(x) of 100. The candidate attribution 180(y) that specifies the speed limit source 184 as the speed limit specification 130 xyz and the target road segment 182 as a road segment other than the road segment xyz is associated with the candidate confidence 190(y) of 0.

After performing any number of propagation operations to generate the candidate attributions 180 and computing the associated candidate confidences 190, the speed limit application 170 may evaluate the candidate confidences 190. For each candidate confidence 190, if the speed limit application 170 determines that the candidate confidence 190 satisfies a minimum confidence requirement, then the speed limit application 170 generates a new attribute 158 based on associated candidate attribution 180. If, however, the speed limit application 170 determines that the candidate confidence 190 does not satisfy a minimum confidence requirement, then the speed limit application 170 discards the associated candidate attribution 180 without generating a corresponding new attribute 158. Subsequently, the speed limit application 170 modifies the road graph 140 to specify any newly generated attributes. In some embodiments, the speed limit application 170 may transmit the updated road graph 140 to any number of applications. The application may then perform navigation-related operations based on the updated road graph 150.

The speed limit application 170 may implement any minimum confidence requirement in any technically feasible fashion. For example, the speed limit application could receive a minimum confidence requirement of 80 from a graphical user interface (GUI), and compare each of the candidate confidences 190 to 80. In alternate embodiments, the speed limit application 170 may associate the speed limit 134 specified in the speed limit source 184 with the target road 182 in any technically feasible fashion. In the same or other embodiments, the speed limit application 170 may transmit any information associated with candidate attributions 180 that satisfy the minimum confidence requirement to any application in any technically feasible fashion. For instance, the speed limit application 170 may be implemented in a navigation subsystem and the speed limit application 170 may transmit the new attributes 158 directly to an associated navigation application.

As shown, the speed limit application 170 resides in a memory 116 that is included in the compute instance 110 and executes on a processor 112 that is included in the compute instance 110. In alternate embodiments, the road graph system 100 may include any number of compute instances 110, any number of memories 116, and any number of processors 112 that are implemented in any technically feasible fashion. Further, the speed limit application 170 may include multiple different components, and the components may reside in different memories 116, execute on different processors 112, and/or be associated with different compute instances 110.

In various embodiments, the compute instance 110 may be implemented as a stand-alone chip or as part of a more comprehensive solution that is implemented as an application-specific integrated circuit (ASIC), a system-on-a-chip (SoC), and so forth. Further, the compute instance 110, the memory 116, and the processor 112 may be implemented via any number of physical resources located in any number of physical positions. For example, the speed limit application 170 could be included in the compute instance 110(1) that is implemented in a laptop. In another example, the speed limit application 170 could be included in a compute instance 110(2) that is implemented in a cloud computing environment or a distributed computing environment.

The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112. The memory 116 may be one or more of a readily available memory, such as random access memory (RAM), read only memory (ROM), floppy disk, hard disk, or any other form of digital storage, local or remote.

In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, cloud storage, a Blu-ray Disc, other tangible storage media, or any suitable combination of the foregoing.

It will be appreciated that the road graph system 100 shown herein is illustrative and that variations and modifications are possible. The number of compute instances 110, the number of speed limit applications 170, the number of road graphs 140, the type and amount of observation data 120, the number and type of traffic law databases 102, and the connection topology between the various units in the road graph system 100 may be modified as desired. The speed limit application 170 may be implemented in a stand-alone fashion or integrated in any other application (e.g., a navigation application) or device in any technically feasible fashion. Further, the functionality included in the speed limit application 170 may be divided across any number of applications that are stored and executed via any number of devices that are located in any number of physical positions.

In alternate embodiments, the observation data 120 may be generated in any technically feasible fashion based on any amount of information. For example, in some alternate embodiments, the observation data 120 may be generated directly from any type of surveying application instead of the data collection application and each sign limit specification 130 may represent only one survey data point. In other alternate embodiments, any number and type of applications executing in any type of device may provide any type of functionality based on the road graph 120 and/or the new attributes 158 generated by the speed limit application 170.

Extrapolating Speed Limits to Road Segments

Figure 2:
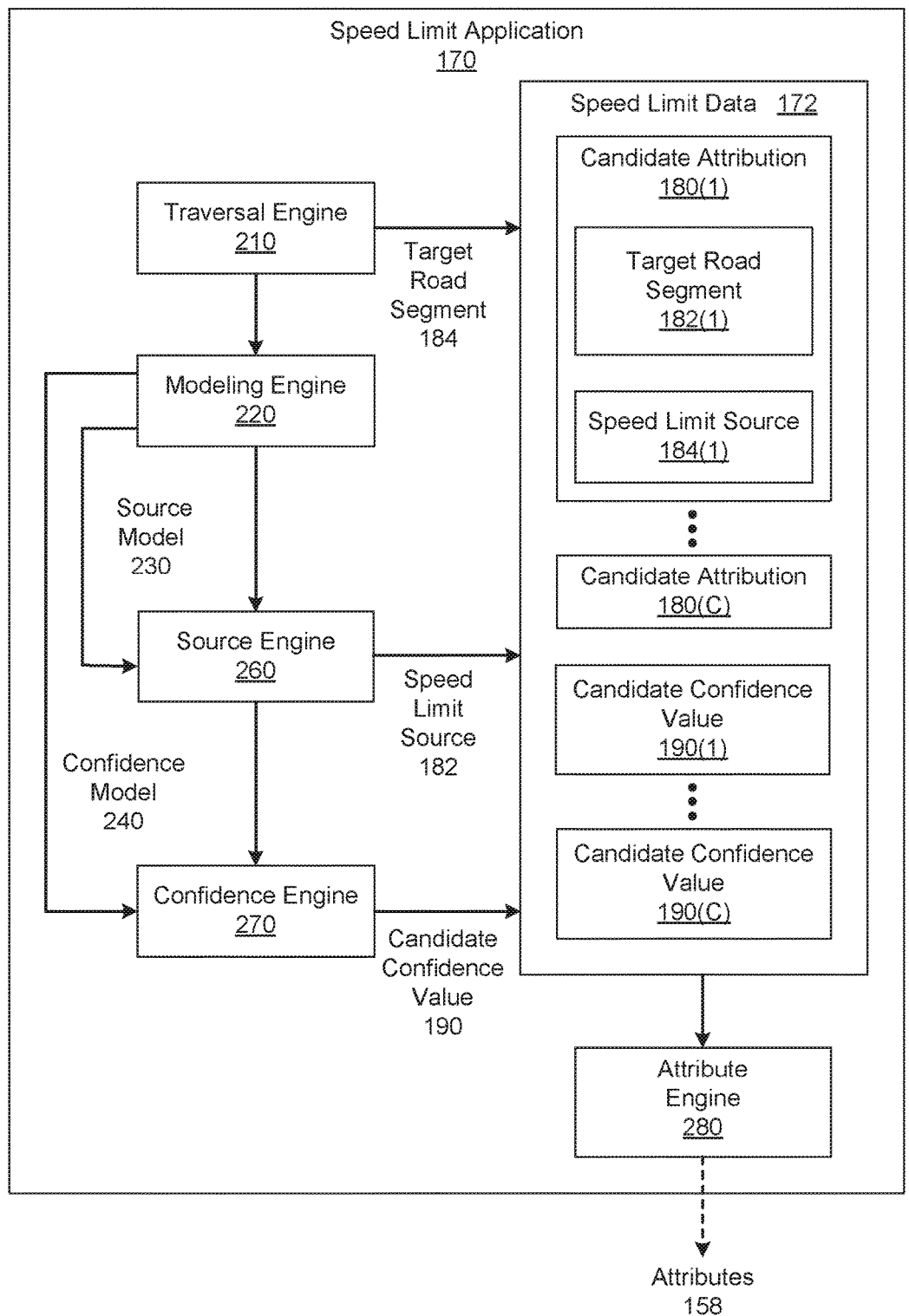
FIG. 2 is a more detailed illustration of the speed limit application of FIG. 1, according to various embodiments.

FIG. 2 is a more detailed illustration of the speed limit application 170 of FIG. 1, according to various embodiments. As shown, the speed limit application 170 includes, without limitation, the speed limit data 172, a traversal engine 210, a modeling engine 220, a source engine 260, a confidence engine 270, and an attribute engine 280. Although not shown in FIG. 2, the speed limit application 170 receives, without limitation, the observation data 120, the road graph 140, and the traffic law database 102. The speed limit application 170 generates any number of attributes 158, where each of generated attributes 158 associates one of the speed limits 134 specified in the observation data 120 with one of the road segments represented in the road graph 140. Notably, the total number of the generated attributes 158 may exceed the total number of the speed limits 134 specified in the observation data 120.

In operation, the traversal engine 210 sequentially selects each of the road segments represented in the road graph 140. In general, the traversal engine 210 implements a selection ordering that begins with the road segments 310 along which speed limit signs lie as per the speed limit specifications 130 included in the observation data 120. In various embodiments, the traversal engine 210 may select the road segments in any technically feasible ordering and/or fashion that ensures that the sequence of road segments along which a particular speed limit 134 is extrapolated to a particular target road segment 182 is processed before the target road segment 182. After selecting a road segment, the traversal engine 210 generates the associated candidate attribution 180 that specifies the road segment as the target road segment 182. More precisely, the traversal engine sets the target road segment 182 to specify the road segment identifier 162 of the selected road segment.

The modeling engine 220 evaluates any number of the observation data 120, the road graph 140, and the traffic law database 102 to identify a source model 230 and a confidence model 240 that are applicable to the target road segment 132. The identified source model 230 specifies how to determine the speed limit source 184 that may potentially be extrapolated to the target road segment 182. In a complementary fashion, the identified confidence model 240 specifies how to compute the associated candidate confidence value 190 associated with the extrapolation. The modeling engine 220 may identify the source model 230 and the confidence model 240 in any technically feasible fashion.

For example, if the modeling engine 220 determines that an observed road sign lies along the target road segment 182 based on one of the speed limit specifications 130, then the modeling engine 220 could identify the source model 230 "direct" and the confidence model 240 "direct confidence." The source model 230 "direct" could specify a single rule that the speed limit source 184 is equal to the speed limit specification 130 specifying the speed limit sign that lies along the target road segment 182. In a complementary fashion, the confidence model 240 "direct confidence" could specify that the associated confidence value 190 is the product of the clustering confidence value 136 and the matching confidence value 138 included in the speed limit source 184.

In another example, if the modeling engine 220 determines that a start of the target road segment 132 corresponds to an intersection that includes two incoming road segments and a single outgoing road segment (i.e., the target road segment 132), then the modeling engine 220 could identify the source model 230 "join" and the confidence model 240 "join confidence." The source model 230 "join" could specify an algorithm for determining the speed limit source 184 based on any maneuver restrictions associated with the intersection, as well as comparing functional road classes, angles, names, and/or number of lanes of the road segments that meet at the intersection. The confidence model 230 "join confidence" could specify an algorithm for determine the associated confidence value 190. The algorithm could include any number of parameters. For example, the algorithm could be specified based on a total length of extrapolation from the sign position 132 to the start of the target road segment 182 (i.e. the intersection), the complexity of any other intersections that lie between the sign position 132 and the intersection, the clustering confidence value 136, and the matching confidence value 138.

Similarly, if the modeling engine 220 determines that a start of the target road segment 132 corresponds to an intersection that includes one incoming road segment and two outgoing road segments (i.e., the target road segment 182 and another road segment), then the modeling engine 220 could identify the source model 230 "split" and the confidence model 240 "split confidence." The source model 230 "split" could specify an algorithm for determining the speed limit source 184 based on any maneuver restrictions associated with the intersection, as well as comparing functional road classes, angles, names, and/or number of lanes of the road segments that meet at the intersection. The confidence model 230 "split confidence" could specify an algorithm for determining the associated confidence value 190. The algorithm could include any number of parameters. For example, the algorithm could be specified based on a total length of extrapolation from the sign position 132 to the start of the target road segment 132 (i.e. the intersection), the complexity of any other intersections that lie between the sign position 132 and the intersection, the clustering confidence value 136, and the matching confidence value 138.

In some embodiments, the modeling engine 220 may determine that one or more traffic laws included in the traffic law database 102 are applicable to the target road segment 182. The modeling engine 220 may then select the source model 230 and the confidence model 240 based on the applicable laws. The modeling engine 220 may identify applicable traffic laws in any technically feasible fashion. For example, the modeling engine 220 could determine that the start of the target road segment 182 lies within a geographical region for which extrapolation of speed limits 134 after intersections is prohibited. The modeling engine 220 would then identify the source model 230 "terminate" and the confidence model 240 "terminate confidence." The source model 230 terminate could specify a single rule that the speed limit source 184 is NULL to indicate that no speed limit 134 is to be extrapolated to the target road segment 182. In a complementary fashion, the confidence model 240 "terminate confidence" could specify that the associated confidence value 190 is 0.

In some embodiments, the modeling engine 220 may identify applicable traffic laws based on the observation data 120 specifying other types of road signs, existing attributes 158, and or the topology of the road graph 120. For example, the modeling engine 220 may identify that the target road segment 182 is associated with a traffic law specifying behavior based on a maximum distance of extrapolation, a functional road class, a type of a subsequent intersection, a start or end of a residential area, a start or end of a motorway, a start or end of an express road, or a change in the functional road class. The identified traffic law may specify any type of behavior in any technically feasible fashion. For example, the identified traffic law could be associated with a road sign indicating a type of road or neighborhood and could specify that extrapolation of the speed limit 134 to the target road segment 182 is allowed or prohibited.

Upon receiving the source model 230 from the modeling engine 220, the source engine 260 determines the speed limit source 182 associated with the target road segment 182 and included in the candidate attribution 180 based on the source model 230. In this fashion, the source engine 260 finishes specifying the candidate attribution 180. As part of determining the speed limit source 182, the source engine 260 may determine values for any parameters included in the source model 230 based on the observation data 230, the attributes 158 specified in the road graph 140, and the topology specified in the road graph 140.

For example, the source model 230 could determine the angle associated with an incoming road segment based on the road segment geometry 166. The source engine 260 may also perform any number of computations based on the source model 230. For example, the source engine 260 could compare angles associated with two incoming road segments, where each incoming road segment is associated with extrapolation from a different speed limit source 182. Although not shown in FIG. 2, in some embodiments, if the source engine 260 is unable to identify the speed limit source 182 based on the source model 230, then the source engine 260 deletes the candidate attribution 180 for the target road segment 182. The traversal engine 210 then selects a new target road segment 184 for processing.

After the source engine 260 finishes specifying the candidate attribution 180, the confidence engine 270 computes the associated candidate confidence value 190 based on the confidence model 230. As part of determining the candidate confidence value 190, the confidence engine 270 may determine values for any parameters included in the confidence model 240 based on the observation data 230, the attributes 158 specified in the road graph 140, and the topology specified in the road graph 140. For example, the confidence model 230 could determine the clustering confidence value 136 specified in the speed limit source 182. The confidence engine 270 may also perform any number of computations based on the confidence model 230. For example, the confidence engine 270 could compute the total extrapolation distance between the sign position 132 and the start of the target road segment 182.

After the confidence engine 270 computes the candidate confidence value 190, the traversal engine 210 selects a new target road segment 184 for processing. After the traversal engine 210 has selected all the target road segments 182 for which the speed limit specifications 130 may be potentially extrapolated, the attribute engine 280 evaluates the candidate confidence values 190. For each of the candidate confidence values 190, the attribute engine 280 determines whether the candidate confidence value 190 indicates that the candidate attribution 180 satisfies a minimum confidence requirement. If the attribute engine 280 determines that the candidate attribution 180 satisfies the minimum confidence requirement, then the attribute engine 280 associates the speed limit 134 specified in the speed limit source 184 with the target road 182.

The attribute engine 280 may associate the speed limit 134 specified in the speed limit source 184 with the target road 182 in any technically feasible fashion. For instance, in some embodiments, the attribute engine 280 adds a new attribute 158 to the road graph 140. In alternate embodiments, the attribute engine 280 may transmit any information associated with candidate attributions 180 that satisfy the minimum confidence requirement to any application in any technically feasible fashion. For instance, the speed limit application 170 may be implemented in a navigation subsystem and the speed limit application 170 may transmit the speed limits 134 directly to an associated navigation application for display purposes.

Note that the techniques described herein are illustrative rather than restrictive, and may be altered without departing from the broader spirit and scope of the contemplated embodiments. Many modifications and variations on the functionality provided by the speed limit application 170 will be apparent to those of ordinary skill in the art without departing from the scope and spirit of the described embodiments. For instance, in some embodiments, the modeling engine 220 may generate a sequence of source models 230 and/or confidence models 240, where each model is associated with a road segment included in an extrapolation chain from the speed limit source 184 to the target road segment 182. In the same or other embodiments, the speed limit application 170 may not compute the candidate confidence levels 172. In general, the modeling engine 220 may identify the source model 230 and the confidence model 240, and determine the speed limit data 172 in any technically feasible fashion based on any amount and type of available data.

Figure 3:
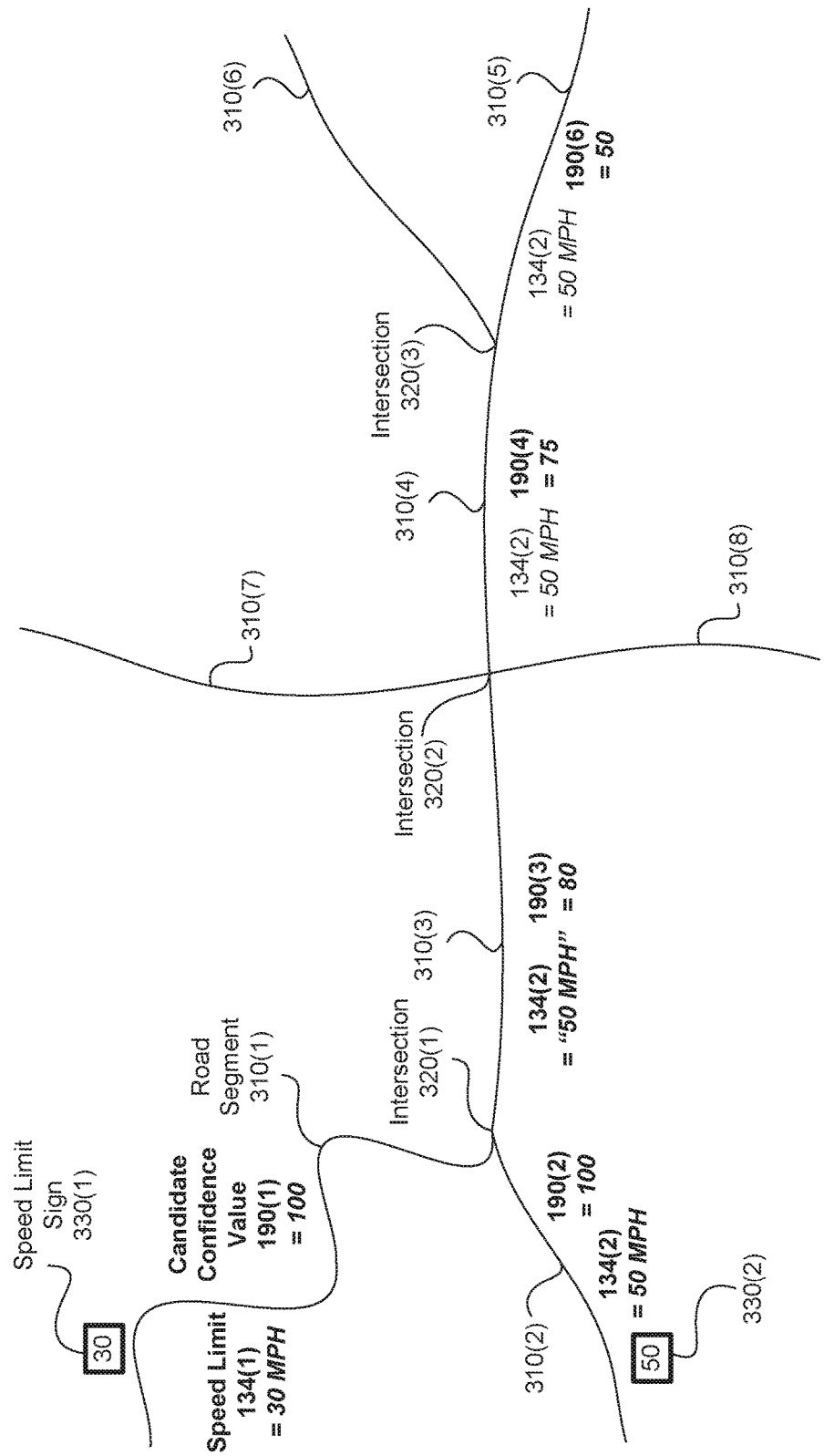
FIG. 3 illustrates an example of speed limit signs and candidate confidence values of FIG. 2, according to various embodiments.

FIG. 3 illustrates an example of speed limit signs 330 and the candidate confidence values 190 of FIG. 2, according to various embodiments. As shown, the speed limit sign 330(1) lies along a road segment 310(1) and specifies a speed limit 134(1) of 30 MPH. A speed limit sign 330(2) lies along the road segment 310(2) and specifies a speed limit 134(2) of 50 MPH. There are no speed limit signs 330 lying along any of the remaining road segments 310. For explanatory purposes only, the road graph 140 initially includes no attributes 158 and the traffic law database 102 includes no applicable traffic laws.

Although not shown, the observation data 120 includes the speed limit specification 130(1) "30 MPH" associated with observations of the speed limit sign 330(1), and the speed limit specification 130(2) "50 MPH" associated with observations of the speed limit sign 330(2). For explanatory purposes only, for each of the speed limit specifications 130, the clustering confidence value 136 equals 100 and the matching confidence value 138 equals 100. In general, a confidence value of 100 indicates a highest possible likelihood that the associated data is accurate. By contrast, a confidence value of 0 indicates a lowest possible likelihood that the associated data is accurate.

First, the traversal engine 210 generates the candidate attribution 180(1) and sets the target road segment 182(2) to specify the road segment 310(1). The modeling engine 220 selects the source model 230 "direct" and the confidence model 240 "direct confidence" to reflect that the speed limit sign 330(1) lies along the road segment 310(1). As per the source model 230 "direct," the source engine 260 sets the speed limit source 184(1) to the speed limit specification 130(1) "30 MPH." Subsequently, as per the confidence model 240 "direct confidence," the confidence engine 270 sets the associated candidate confidence 190(1) equal to 100 based on the clustering confidence value 136(1) of 100 and the matching confidence value 138(1) of 100.

The traversal engine 210 then generates the candidate attribution 180(2) and sets the target road segment 182(2) to specify the road segment 310(2). The modeling engine 220 selects the source model 230 "direct" and the confidence model 240 "direct confidence" to reflect that the speed limit sign 330(2) lies along the road segment 310(2). As per the source model 230 "direct," the source engine 260 sets the speed limit source 184(2) to the speed limit specification 130(2) "50 MPH." Subsequently, as per the confidence model 240 "direct confidence," the confidence engine 270 sets the associated candidate confidence 190(2) equal to 100 based on the clustering confidence value 136(2) of 100 and the matching confidence value 138(2) of 100.

As shown, the road segment 310(1) and the road segment 310(2) join to form the road segment 310(3) at an intersection 320(1). The traversal engine 210 generates the candidate attribution 180(3) and sets the target road segment 182(3) to specify the road segment 310(3). The modeling engine 220 selects the source model 230 "join" and the confidence model 240 "join confidence" to reflect the topology of the intersection 320(1). Notably, the angle between the road segment 310(3) and the road segment 130(2) is smaller than the angle between the road segment 310(2) and the road segment 310(1). Consequently, as per the source model 230 "join," the source engine 260 determines that the speed limit source 184(3) is the speed limit specification 130(2) "50 MPH." Subsequently, as per the confidence model 240 "join confidence," the confidence engine 270 sets the associated candidate confidence 190(3) equal to 80 based on the topology of the road graph 140.

The road segment 310(3), the road segment 310(4), the road segment 310(7), and the road segment 310(8) meet at the intersection 320(2). As shown, at the intersection 320(2), the angle associated with the road segment 310(3) is similar to the angle associated with the road segment 310(4) and is roughly perpendicular to the angles associated with the road segments 310(7) and 310(8). The traversal engine 210 generates the candidate attribution 180(4) and sets the target road segment 182(4) to specify the road segment 310(4).

The modeling engine 220 selects the source model 230 "simple" and the confidence model 240 "simple confidence" to reflect the topology of the intersection 320(2). The angle of travel associated with the road segment 310(4) is roughly equal to the angle of travel associated with the road segment 310(3). Consequently, as per the source model 230 "simple," the source engine 260 determines that the speed limit source 184(4) is the speed limit specification 130(2) "50 MPH." Subsequently, as per the confidence model 240 "simple confidence," the confidence engine 270 sets the associated candidate confidence 190(4) equal to 75 based on the topology of the road graph 140.

At the intersection 320(3), the road segment 310(4) splits to form the road segments 310(5) and 310(6). First, the traversal engine 210 generates the candidate attribution 180(5) and sets the target road segment 182(5) to specify the road segment 310(5). The modeling engine 220 selects the source model 230 "split" and the confidence model 240 "split confidence" to reflect the intersection 320(3). The angle between the road segment 310(4) and the road segment 130(5) is smaller than the angle between the road segment 310(4) and the road segment 310(6). Consequently, as per the source model 230 "split," the source engine 260 determines that the speed limit source 184(5) is the speed limit specification 130(2) "50 MPH." Subsequently, as per the confidence model 240 "split confidence," the confidence engine 270 sets the associated candidate confidence 190(5) equal to 50 based on the topology of the road graph 140.

Next, the traversal engine 210 generates the candidate attribution 180(6) and sets the target road segment 182(6) to specify the road segment 310(6). The modeling engine 220 selects the source model 230 "split" and the confidence model 240 "split confidence" to reflect the intersection 320(3). As shown, the angle of travel associated with the road segment 310(6) is nearly perpendicular to the angle of travel associated with the road segment 310(4). Consequently, as per the source model 230 "split," the source engine 260 sets the speed limit source 184(6) equal to NULL. In this fashion, the speed limit source 184(6) indicates that the source engine 260 is unable to determine any speed limit specification 130 that may be reliably extrapolated to the road segment 310(6). The source engine 260 then deletes the candidate attribute 310(6).

Although not shown, for each of the candidate confidences 190, the attribute engine 280 compares the candidate confidence 190 to a minimum confidence requirement, such as a minimum confidence requirement of 80. As a result of the comparison operations, the attribute engine 280 modifies the road graph 140 to add the attribute 158(1) "speed limit 30 MPH" to the edge 160(1) representing the road segment 310(1). The attribute engine 280 then adds the attribute 158(2) "speed limit 50 MPH" to the edge 160(2) representing the road segment 310(2). Finally, the attribute engine 280 adds the attribute 158(3) "speed limit 50 MPH" to the edge 160(3) representing the road segment 310(3). By contrast, a conventional attribute generation engine would not add the attribute 158(3) to the conventional road graph.

As the example described above illustrates, extrapolating the speed limits 134 specified via observed speed limit signs 330 results in a road graph 140 that more comprehensively specifies the actual speed limits in force for the different road segments 310 than a conventional road graph. In particular, a navigation application relying on the road graph 140 properly associates a speed limit of 50 MPH with the road segment 310(3) and accurately performs navigation-related operations. By contrast, a navigation application relying on a conventional road graph would not associate a speed limit of 50 MPH with the road segment 310(3) and would not reliably perform navigation-related operations with respect to road segment 310(3).

Figure 4:
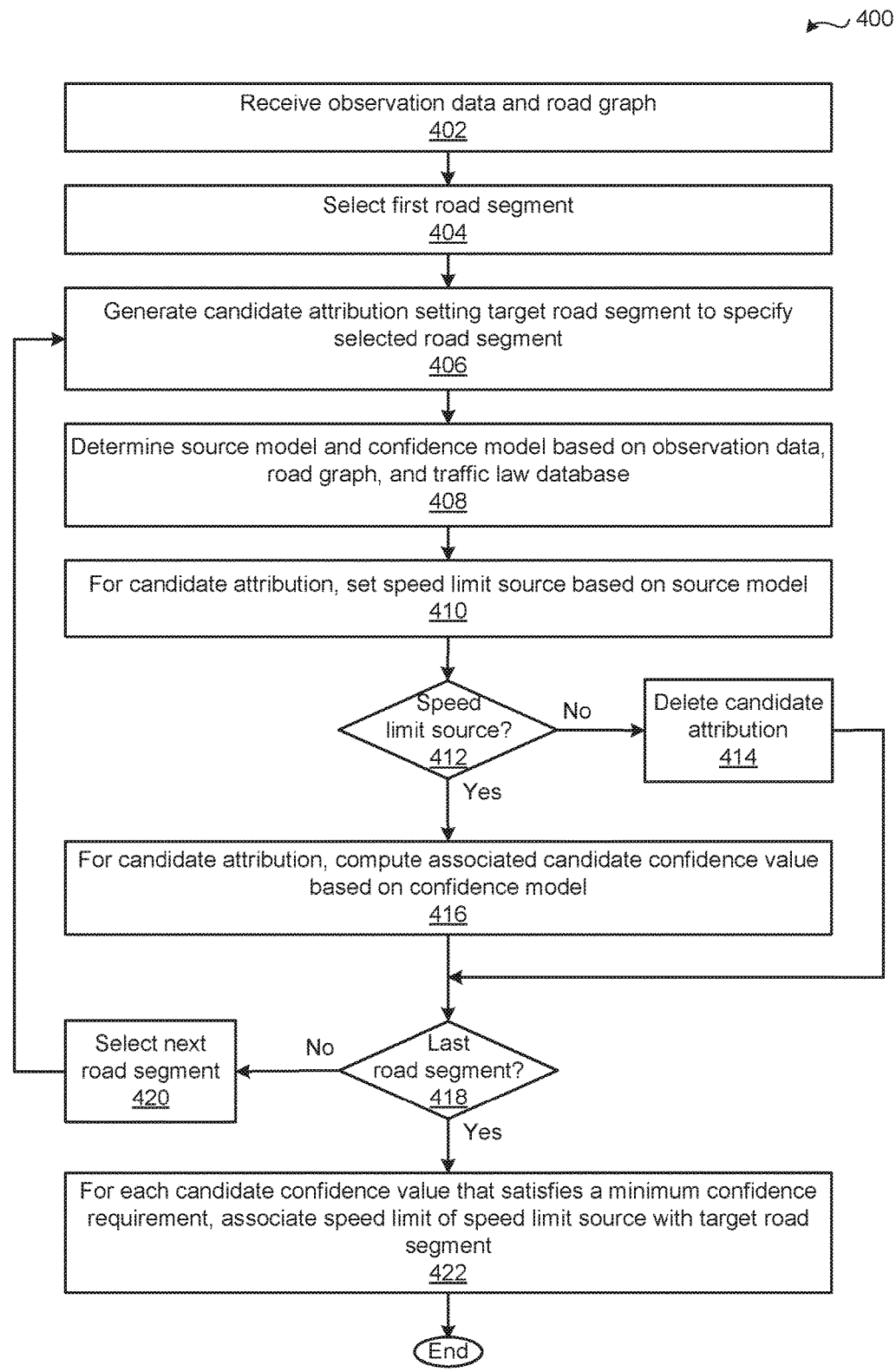
FIG. 4 is a flow diagram of method steps for associating speed limits with road segments, according to various embodiments.

FIG. 4 is a flow diagram of method steps for associating speed limits with road segments, according to various embodiments. Although the method steps are described in conjunction with the systems of FIGS. 1-3, persons skilled in the art will understand that any system configured to implement the method steps, in any order, falls within the scope of the contemplated embodiments.

As shown, a method 400 begins at step 402, where the speed limit application 170 receives the observation data 120 and the road graph 140. At step 404, the traversal engine 210 selects a first road segment 310 based on the road graph 140. In general, the traversal engine 210 implements a selection ordering that begins with the road segments 130 along which the speed limit signs 330 lie as per the observation data 120. In various embodiments, the traversal engine 210 may select the road segments in any technically feasible ordering and/or fashion that ensures that the sequence of road segments 310 along which a particular speed limit 134 is extrapolated to a particular target road segment 182 is processed before the target road segment 182.

At step 406, the traversal engine 210 generates the candidate attribution 180 corresponding to the selected road segment 310. More specifically, the traversal engine 210 generates a new candidate attribution 180 that includes a target road segment 182 specifying the road segment identifier 162 of the selected road segment 310. At step 408, the modeling engine 220 evaluates any number of the observation data 120, the road graph 140, and the traffic law database 102 to determine the source model 230 and the confidence model 240. As part of the evaluation, the modeling engine 220 may determine whether the target road segment 182 is associated with one of the speed limit specifications 130, evaluate the topology and/or any number of the attributes 158 associated with the road graph 140, and/or identify any applicable traffic laws included in the traffic law database 102.

At step 410, for the candidate attribution 180, the source engine 260 sets the speed limit source 184 based on the source model 230. The speed limit source 184 specifies a particular speed limit specification 130 that may be applicable to the target road segment 182. For example, suppose that no speed limit sign 130 lies along the target road segment 182. If the source model 230 indicates that the speed limit specification 130(j) may be applicable to the target road segment 182, then the source engine 260 would set the speed limit source 184 to specify the speed limit specification 130(j). If, however, the source model 230 indicates that no speed limit sign 330 that lies along another road segment 310 is in force for the target road segment 182, then the source engine 260 would set the speed limit source 184 to indicate that there is no speed limit sign 330 that is applicable to the target road segment 182. In alternate embodiments, the source engine 260 may determine the speed limit source 184 in any technically feasible fashion based on any available data.

At step 412, the source engine 260 determines whether the speed limit source 184 indicates that one of the speed limit signs 330 is applicable to the target road segment 182. If, at step 412, the source engine 260 determines that the speed limit source 184 indicates that none of the speed limit signs 330 is applicable to the target road segment 182, then the method 400 proceeds to step 414. At step 414, the source engine 260 deletes the candidate attribution 180, and the method 400 proceeds directly to step 418.

If, however, at step 412, the source engine 260 determines that the speed limit source 184 indicates that one of the speed limit signs 220 is applicable to the target road segment 182, then the method 400 proceeds directly to step 416. At step 416, for the candidate attribution 180, the confidence engine 270 computes the associated candidate confidence value 190 based on the confidence model 240. For example, the confidence engine 270 could compute the associated candidate confidence value 190 based on any number and combination of confidence values, topology factors, and attribute factors.

Examples of confidence values include the clustering confidence value 136 and the matching confidence value 138 associated with the speed limit source 184. An example of a topology value is an extrapolation distance between the sign position 132 associated with the speed limit source 184 and the start of the target road segment 182. An example of an attribute factor is a restriction complexity that reflects any maneuver restrictions specified via the attributes 158 included in the nodes 150 representing the intersections 320 that lie between the sign position 132 and the target road segment 182. In alternate embodiments, the confidence engine 270 may compute the candidate confidence value 190 in any technically feasible fashion and based on any available data.

At step 418, the traversal engine 210 determines whether the selected road segment 310 is the last road segment 310 represented in the road graph 140 for which one of the speed limits 134 could potentially be propagated. If, at step 418, the traversal engine 210 determines that the selected road segment 310 is not the last road segment 310, then the method 400 proceeds to step 420. At step 420, the traversal engine 210 selects a next road segment 310 represented in the road graph 140, and the method 400 returns to step 406, where the traversal engine 210 generates a new candidate attribution 180.

If, however, at step 418, the traversal engine 210 determines that the selected road segment 310 is the last road segment 310, then the method 400 proceeds directly to step 422. At step 422, for each of the candidate confidence values 190, the attribute engine 280 determines whether the candidate confidence value 190 indicates that the associated candidate attribution 180 satisfies a minimum confidence requirement. If the attribute engine 280 determines that the candidate attribution 180 satisfies the minimum confidence requirement, then the attribute engine 280 associates the speed limit 134 specified in the speed limit source 184 with the target road 182.

The attribute engine 280 may associate the speed limit 134 specified in the speed limit source 184 with the target road 182 in any technically feasible fashion. For instance, in some embodiments, the attribute engine 280 adds a new attribute 158 to the road graph 140. In alternate embodiments, the attribute engine 280 may transmit any information associated with candidate attributions 180 that satisfy the minimum confidence requirement to any application in any technically feasible fashion. For instance, the speed limit application 170 may be implemented in a navigation subsystem and the speed limit application 170 may transmit the new attributes 158 directly to an associated navigation application for display purposes. The method 400 then terminates.

In sum, the disclosed techniques may be used to associate speed limits with road segments based on observations of speed limit signs. A speed limit application includes, without limitation, a traversal engine, a modeling engine, a source engine, a confidence engine, and an attribute engine. In operation, the traversal engine traverses a road graph starting with road segments along which speed limit signs were observed. The traversal engine selects and specifies a target road segment in a candidate attribution. The modeling engine characterizes the target road segment based on the topology of the road graph, attributes associated with the road graph, and a traffic law database to identify a source model and a confidence model.

The source engine attempts to identify a speed limit specification included in the observation data that may be applicable to the target road segment based on the source model. The source engine then updates a speed limit source included in the candidate attribution to specify the identified speed limit specification. If the source engine is unable to identify a speed limit source that is applicable to the target road segment, then the source engine deletes the candidate attribution and the traversal engine selects a new target road segment. If, however, the source engine identifies a speed limit source, then the confidence engine computes a candidate confidence value associated with the candidate attribution based on the confidence model.

After the traversal engine finishes traversing the road graph, the attribute engine evaluates each of the candidate confidence values. If a candidate confidence value indicates that the associated candidate attribution satisfies a minimum confidence requirement, then the attribute engine generates a new attribute. The new attribute associates the target road segment with the speed limit specified in the speed limit source. If, however, a candidate confidence value indicates that the associated candidate attribution does not satisfy the minimum confidence requirement, then the attribute engine deletes the candidate attribution. Finally, the attribute engine adds the new attributes to the road graph.

At least one advantage of the disclosed techniques is that the speed limit application extrapolates speed limits from a road segment along which a speed limit sign lies to subsequent road segments for which the speed limit sign is likely in force. As a result, navigation applications that rely on the road graph may reliably perform navigation operations involving the subsequent road segments. By contrast, conventional approaches to applying speed limit signs typically do not extrapolate speed limit signs and, consequently, would be unable to generate road graphs that enable navigation applications to reliably perform navigation-related operations involving speed limits.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for associating speed limits with road segments, the method comprising:

identifying a first road segment included in a first road graph as a source of a second road segment, wherein the first road segment is associated with a first speed limit and meets the second road segment at a first intersection;

extrapolating the first speed limit to the second road segment based on the first road graph;

generating a first attribute that associates the first speed limit with the second road segment; and causing a first navigation-related operation to be performed based on the first attribute.

2. The method of claim 1, wherein identifying the first road segment comprises:

determining that the first intersection joins the first road segment and a third road segment to the second road segment; and comparing the first road segment, the second road segment, and the third road segment based on at least one of a functional road class, an angle, a number of lanes, and a road name to determine that the first road segment is the source of the second road segment.

3. The method of claim 1, wherein identifying the first road segment comprises determining that the first road segment is the only road segment that arrives at the first intersection in a first traveling direction, and the second road segment exits the first intersection in the first traveling direction.

4. The method of claim 1, further comprising associating the first speed limit with the first road segment based on one or more observations of a speed limit sign.

5. The method of claim 1, further comprising, prior to generating the first attribute:

determining a first confidence value associated with extrapolating the first speed limit to the second road segment based on the first road graph; and determining that the first confidence value satisfies a minimum confidence requirement.

6. The method of claim 5, wherein determining the first confidence value comprises:

computing a first value based on one or more confidence values associated with the one or more observations;

computing an extrapolation length between the first intersection and the speed limit sign associated with the first speed limit; and computing the first value based on the confidence factor and the extrapolation length.

7. The method of claim 1, wherein identifying the first road segment comprises:

determining that a first road sign indicating a type of road or neighborhood lies along the second road segment based on one or more attributes included in the first road graph;

identifying a traffic law based on the type of road or neighborhood and a location of the first intersection; and determining that the traffic law indicates that a preceding speed limit is in force for the second road segment.

8. The method of claim 1, wherein causing the first navigation-related operation to be performed comprises adding the first attribute to the first road graph to generate a second road graph, and transmitting the second road graph to a navigation application, wherein the navigation application performs the first navigation-related operation.

9. The method of claim 1, further comprising:
identifying the second road segment included in a first road graph as a source of a third road segment, wherein the second road segment meets the third road segment at a second intersection;
extrapolating the first speed limit to the third road segment based on the first road graph;
generating a second attribute that associates the first speed limit with the third road segment; and
causing a first navigation-related operation to be performed based on the second attribute.

10. A non-transitory computer-readable storage medium including instructions that, when executed by a processor, cause the processor to associate speed limits with road segments by performing the steps of:
identifying a first road segment included in a first road graph as a source of a second road segment, wherein the first road segment is associated with a first speed limit and meets the second road segment at a first intersection;
determining that the first speed limit is applicable to the second road segment;
generating a first attribute that associates the first speed limit with the second road segment; and
causing a first navigation-related operation to be performed based on the first attribute.

11. The computer-readable storage medium of claim 10, wherein identifying the first road segment comprises:
determining that the first road segment splits into the second road segment and a third road segment at the first intersection; and
comparing the first road segment, the second road segment, and the third road segment based on at least one of a functional road class, an angle, a number of lanes, and a road name to determine that the first road segment is the source of the second road segment.

12. The computer-readable storage medium of claim 10, wherein identifying the first road segment comprises determining that the first road segment is the only road segment that arrives at the first intersection in a first traveling direction, and the second road segment exits the first intersection in the first traveling direction.

13. The computer-readable storage medium of claim 10, further comprising associating the first speed limit with the first road segment based on one or more observations of a speed limit sign.

14. The computer-readable storage medium of claim 10, wherein determining that the first speed limit is applicable to the second road segment comprises:
determining a first confidence value associated with extrapolating the first speed limit to the second road segment based on the first road graph; and
determining that the first confidence value satisfies a minimum confidence requirement.

15. The computer-readable storage medium of claim 14, wherein determining the first confidence value comprises:
computing an extrapolation length between the first intersection and a speed limit sign associated with the first speed limit;
evaluating one or more intersections that lie between the speed limit sign and the second road segment to determine a complexity value, wherein the one or more intersections includes the first intersection;
computing the first confidence value based on the extrapolation length and the complexity value.

16. The computer-readable storage medium of claim 10, wherein determining that the first speed limit is applicable to the second road segment comprises:
determining that a first road sign indicating a type of road or neighborhood lies along the second road segment based on one or more attributes included in the first road graph;
identifying a traffic law based on the type of road or neighborhood and a location of the first intersection; and
determining that the traffic law indicates that a preceding speed limit is in force for the second road segment.

17. The computer-readable storage medium of claim 10, wherein causing the first navigation-related operation to be performed comprises adding the first attribute to the first road graph to generate a second road graph, and transmitting the second road graph to a navigation application, wherein the navigation application performs the first navigation-related operation.

18. The computer-readable storage medium of claim 10, further comprising:
identifying the second road segment included in a first road graph as a source of a third road segment, wherein the second road segment meets the third road segment at a second intersection;
determining that a first road sign indicating a type of road or neighborhood lies along the third road segment based on one or more attributes included in the first road graph;
identifying a traffic law based on the type of road or neighborhood and a location of the second intersection; and
determining that the traffic law indicates that a preceding speed limit is not in force for the third road segment and, in response, terminating an extrapolation of the first speed limit at the second intersection.

19. A system for associating speed limits with road segments, the system comprising:
a memory storing a speed limit application; and
a processor coupled to the memory, wherein when executed by the processor, the speed limit application causes the processor to:
identify a first road segment included in a first road graph as a source of a second road segment, wherein the first road segment is associated with a first speed limit and meets the second road segment at a first intersection;
extrapolate the first speed limit to the second road segment based on the first road graph;
generate a first attribute that associates the first speed limit with the second road segment; and
cause a first navigation-related operation to be performed based on the first attribute.

20. The system of claim 19, further comprising associating the first speed limit with the first road segment based on one or more observations of a speed limit sign.

* * * * *